(12) United States Patent
Patanwala et al.

(10) Patent No.: US 10,996,323 B2
(45) Date of Patent: May 4, 2021

(54) TIME-OF-FLIGHT IMAGING DEVICE, SYSTEM AND METHOD

(71) Applicant: STMICROELECTRONICS (RESEARCH & DEVELOPMENT) LIMITED, Marlow (GB)

(72) Inventors: Sarrah Moiz Patanwala, Aberdeen (GB); Neale Dutton, Edinburgh (GB)

(73) Assignee: STMICROELECTRONICS (RESEARCH & DEVELOPMENT) LIMITED, Buckinghamshire (GB)

( * ) Notice: Subject to any disclaimer, the term of this patent is extended or adjusted under 35 U.S.C. 154(b) by 541 days.

(21) Appl. No.: 15/902,609

(22) Filed: Feb. 22, 2018

(65) Prior Publication Data

US 2019/0257950 A1 Aug. 22, 2019

(51) Int. Cl.

| G01C 3/08 | (2006.01) |
| G01S 7/4863 | (2020.01) |
| G01S 17/14 | (2020.01) |
| G01S 17/894 | (2020.01) |
| G01S 17/931 | (2020.01) |

(52) U.S. Cl.
CPC ............ *G01S 7/4863* (2013.01); *G01S 17/14* (2020.01); *G01S 17/894* (2020.01); *G01S 17/931* (2020.01)

(58) Field of Classification Search
CPC ........ G01S 17/14; G01S 17/89; G01S 17/894; G01S 17/931; G01S 17/4863; G01S 7/4863
USPC ...................................................... 356/5.01
See application file for complete search history.

(56) References Cited

U.S. PATENT DOCUMENTS

2018/0164415 A1* 6/2018 Buckley ................ G01S 7/4865
2018/0209846 A1* 7/2018 Mandai ................ G01S 7/4863

\* cited by examiner

*Primary Examiner* — Mark Hellner
(74) *Attorney, Agent, or Firm* — Seed IP Law Group LLP

(57) ABSTRACT

A time-of-flight (TOF) imaging system includes illumination circuitry, such as a laser, one or more sensors, such as SPAD arrays, and image processing circuitry. The illumination circuitry illuminates one or more objects in an environment around the TOF imaging system. The sensors generate an image data stream based on reflections from the one or more illuminated objects, and possibly based on reflections from one or more reflectors. The image processing circuitry generates counts associated with distances based on the image data stream and possibly a reflection data stream and stores the generated counts in a histogram using a plurality of bins. Each of the plurality of bins stores counts associated with a respective distance range. A size of a bin in the plurality of bins is a function of the respective distance range, and may be based on a logarithmic function of the distance associated with the bin.

30 Claims, 6 Drawing Sheets

TIME-OF-FLIGHT IMAGING DEVICE, SYSTEM AND METHOD

BACKGROUND

Technical Field

The present description relates to imaging systems, such as Time-of-Flight (TOF) imaging systems including Light Detection and Ranging (LIDAR) systems, which may be used, for example, in automotive applications.

Description of the Related Art

TOF systems, such as LIDAR systems are used in a number of applications, including range finding, depth profiling, 3-D imaging, automotive applications, etc. TOF Image processing techniques often employ histograms, for example, to control the imaging system, to store and process received image data, etc.

For example, a time-domain histogram of a scene spanning a large distance range (e.g., from 1 meter to 300 meters) may create a massive dynamic range of returned photon flux having a difference of many orders of magnitude. Time-to-Digital Converters (TDCs) with direct histogram outputs may have very high data rates and may capture a time-domain histogram of a single spatial point or pixel. To store multiple time slices or depth points the histogram must have many bins, which may present a considerable cost in terms of silicon area.

BRIEF SUMMARY

In an embodiment, a method comprises: illuminating, using an image sensor, one or more objects in an environment around the image sensor; generating, using the image sensor, an image data stream based on reflections from the one or more objects; generating, using image processing circuitry, counts associated with distances based on the image data stream; and storing, using the image processing circuitry, the generated counts in a histogram using a plurality of bins, wherein, each of the plurality of bins stores counts associated with a respective distance range; and a size of a bin in the plurality of bins is a function of the respective distance range. In an embodiment, the method comprises generating a control signal based on the histogram. In an embodiment, the control signal controls an automotive system. In an embodiment, the method comprises generating a pixel occupancy map based on the histogram. In an embodiment, the plurality of bins are organized into sets of bins associated with respective distances. In an embodiment, a size of a respective bin is based on application of a logarithmic function to a distance associated with a set of bins including the bin. In an embodiment, the size of a respective bin is based on a result of the application of the logarithmic function plus a margin. In an embodiment, the method comprises using a plurality of digital-to-time converters of the image processing circuitry to generate the counts associated with distances. In an embodiment, the method comprises using a plurality of counters in the image processing circuitry as bins to store counts. In an embodiment, the method comprises using full and partial addresses in an SRAM of the image processing circuitry as bins to store counts. In an embodiment, the method comprises: illuminating, using the image sensor, a reference reflector; generating, using the image sensor, a reflection data stream based on reflections from the reference reflector; and generating, using image processing circuitry, the counts associated with distances based on the image data stream and the reflection data stream.

In an embodiment, a device comprises: illumination circuitry, which, in operation, illuminates one or more objects in an environment around the device; a sensor, which, in operation, generates an image data stream based on reflections from the one or more illuminated objects; and image processing circuitry, which, in operation: generates counts associated with distances based on the image data stream; and stores the generated counts in a histogram using a plurality of bins, wherein, each of the plurality of bins stores counts associated with a respective distance range; and a size of a bin in the plurality of bins is a function of the respective distance range. In an embodiment, the image processing circuitry, in operation, generates a control signal based on the histogram. In an embodiment, the control signal is an automotive control signal. In an embodiment, the image processing circuitry, in operation, generates a pixel occupancy map based on the histogram. In an embodiment, the plurality of bins are organized into sets of bins associated with respective distances. In an embodiment, a size of a respective bin is based on application of a logarithmic function to a distance associated with a set of bins including the bin. In an embodiment, the size of a respective bin is based on a result of the application of the logarithmic function plus a margin. In an embodiment, the device comprises: a plurality of digital-to-time converters, which, in operation generate the counts associated with distances. In an embodiment, the plurality of bins include a plurality of counters. In an embodiment, the device comprises: an SRAM, which in operation, implements at least part of the plurality of bins. In an embodiment, the device comprises: a reference reflector, which, in operation, is illuminated by the illumination circuitry, wherein the image processing circuitry, in operation: generates a reflection data stream based on reflections from the reference reflector; and generates the counts associated with distances based on the image data stream and the reflection data stream.

In an embodiment, a system comprises: a time-of-flight (TOF) image sensor, including: illumination circuitry, which, in operation, illuminates one or more objects in an environment around the device; a sensor, which, in operation, generates an image data stream based on reflections from the one or more illuminated objects; and image processing circuitry, which, in operation: generates counts associated with distances based on the image data stream; and stores the generated counts in a histogram using a plurality of bins, wherein, each of the plurality of bins stores counts associated with a respective distance range and a size of a bin in the plurality of bins is a function of the respective distance range; and an interface, which in operation, communicative couples the TOF image sensor. In an embodiment, the system comprises: automotive control circuitry, which, in operation, is communicatively coupled to the TOF image sensor via the interface. In an embodiment, the illumination circuitry includes one or more Light Detection and Ranging (LIDAR) sources.

In an embodiment, a non-transitory computer-readable medium's contents cause a time-of-flight (TOF) imaging system to perform a method, the method comprising: illuminating one or more objects in an environment around the TOF image system; generating an image data stream based on reflections from the one or more objects; generating counts associated with distances based on the image data stream; and storing the generated counts in a histogram using a plurality of bins, wherein, each of the plurality of bins stores counts associated with a respective distance range; and a size of a bin in the plurality of bins is a function of the respective distance range. In an embodiment, the method comprises: illuminating a reference reflector; generating a reflection data stream based on reflections from the reference reflector; and generating the counts associated with distances based on the image data stream and the reflection data stream. In an embodiment, the non-transitory computer-readable medium comprises a memory storing instructions which when executed by a processor of the TOF imaging system configure the TOF imaging system to perform the method.

DETAILED DESCRIPTION

In the ensuing description, one or more specific details are illustrated, aimed at providing an in-depth understanding of examples of embodiments of this description. The embodiments may be obtained without one or more of the specific details, or with other methods, components, materials, etc. In other cases, known structures, materials, or operations are not illustrated or described in detail so that certain aspects of embodiments will not be obscured.

Reference to "an embodiment" or "one embodiment" in the framework of the present description is intended to indicate that a particular configuration, structure, or characteristic described in relation to the embodiment is comprised in at least one embodiment. Hence, phrases such as "in an embodiment" or "in one embodiment" that may be present in one or more points of the present description do not necessarily refer to one and the same embodiment. Moreover, particular conformations, structures, or characteristics may be combined in any adequate way in one or more embodiments.

The references used herein are provided merely for convenience and hence do not define the extent of protection or the scope of the embodiments.

Figure 1:
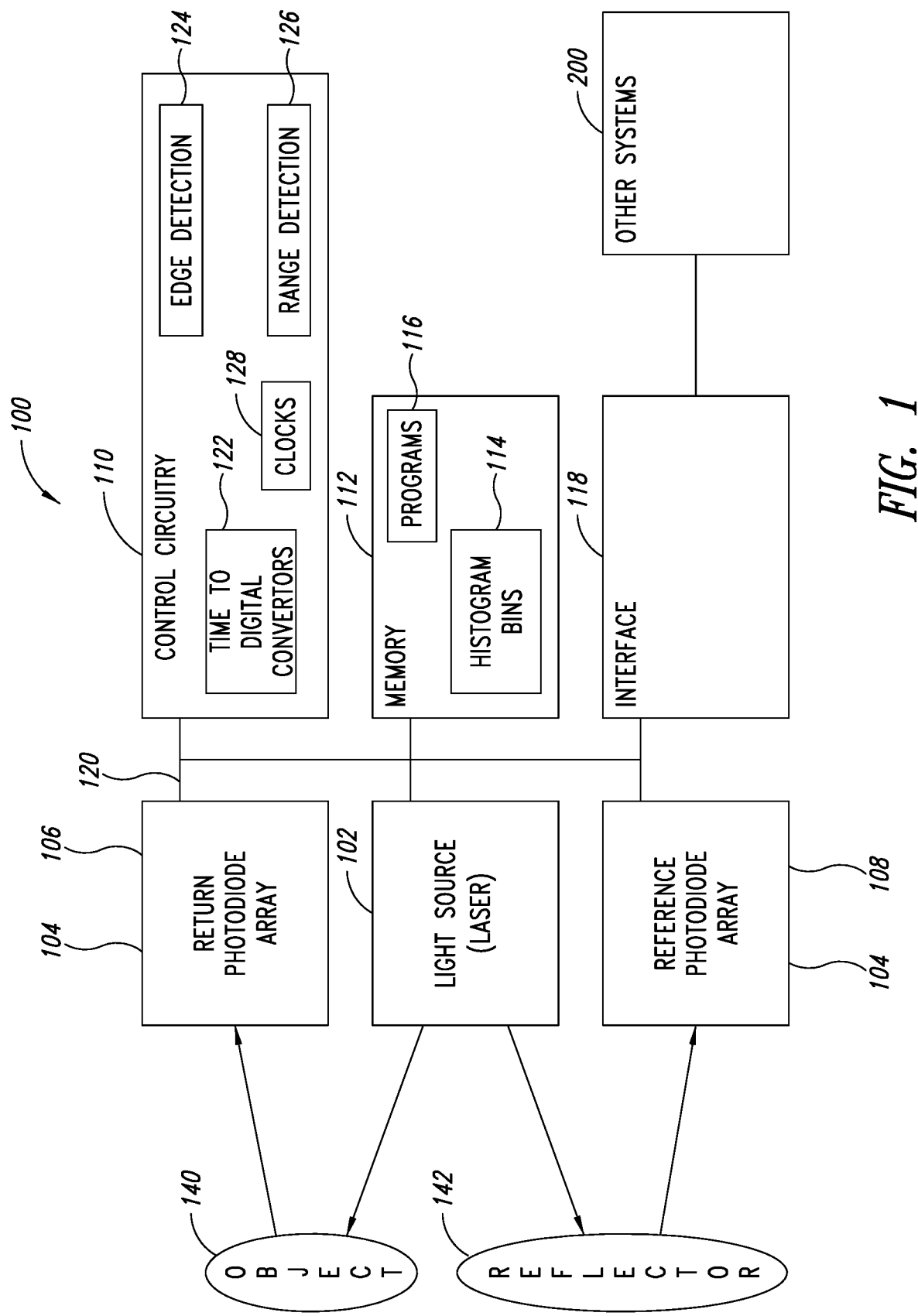
FIG. 1 is a functional block diagram of an embodiment of a time-of-flight imaging system.

FIG. 1 is a functional block diagram of a time-of-flight (TOF) imaging processing system 100, such as a Light Detection and Ranging (LIDAR) system. The system 100 as illustrated comprises one or more light sources 102, such as a laser (e.g., a vertical cavity surface emitting laser (VC-SEL)), one or more sensors 104, such as return photodiode array 106 (e.g., a Single Photo Avalanche Diode (SPAD) array) and a reference photodiode array 108 (e.g., a SPAD array), image processing or control circuitry 110, such as one or more processors, processor cores, discrete circuitry, etc., one or more memories 112, which as illustrated comprises one or more histogram bins 114 and one or more program memories 116, one or more interfaces 118, and a bus system 120, which communicatively couples components of the system 100 together. The histogram bins may comprise, for example, counters, addresses or portions thereof in SRAM, etc. All or part of the system 100 may be formed on a substrate (not shown). The interfaces 118 may communicatively couple the system 100 to one or more other systems 200, such as an automotive control system. In an embodiment, the system 100 may be part of another system, such as the system 200.

The light source 102 generates light pulses to determine a distance of the sensor from an object or a target. The optical source 102 transmits the light pulses and the SPAD arrays 104 detect the reflected light. The reference array 108 may be on the opposite side of a physical optical barrier in the system 100. In the silicon the reference and return arrays may be physically spaced apart to allow for optical isolation. Ultimately, a digital signal is output based on the SPAD arrays, which represents the presence of the returned light. A distance between the sensor and the object can be determined by analyzing the time from the emission of the pulse to the receipt of the reflection.

The control circuitry 110 as illustrated includes one or more time-to-digital converters (TDCs) 122 to synchronize outputs from the sensors 104. The digital code stream output by the TDC 122 can be processed to extract data from the received signals. In operation of an embodiment, a light source 102 illuminates one or more external objects 140 and illuminates a reflector 142, such as a reflective panel. The reflector 142 may typically be integrated into the system 100. The light source 102, for example, may transmit respective pulses to illuminate the object 140 and the reflector 142. The pulses are reflected back to the respective sensors 104, and the sensors 104 generate signals indicative of the reflected light. The TDCs 122 generate a digital code stream based on the signals output by the sensors 104. Distances of the objects 140 and other information may be determined based on the digital code stream (e.g., differences in time between reception of pulses reflected by the object 140 to the return photodiode array 106 and reception of pulses reflected by the reflector 142 to the reference photodiode array 108 may be employed to determine a distance of an object). In an embodiment, the delay between the emission of a light pulse and the detection of a corresponding "echo" from a target object by a photoreceptor may be used in order to estimate the distance to the object, by means of a TOF approach. Such approaches are well known in the art and may be calculated as a function of (light) velocity, distance and time.

The memory 112 may store image data generated by the TDCs 122, instructions and other information (e.g., look-up tables) for use by the control circuitry 110, etc. The control circuitry may control, for example, operation of the light source 102, operation of the sensors 106, storage of the data in the digital output stream generated by the TDCs 122 in the memory 112 (e.g., storage in histogram bins), generation of interpretations of data (e.g., generations of depth maps), generation of signals based on the stored data or interpretations thereof, transmission and reception of signals between the system 100 and other systems, such as via one of the interfaces 118. Object recognition routines and methods, which are known in the art, may be employed to classify objects detected by the system 100 into object types (e.g., other vehicles, humans, guard rails, surface types, road markings, road hazards, etc.). Similarly, image segmentation routines and methods, which are known in the art, may be employed. Filtering of the image data generated by the sensors 104 or of the digital output stream generated by the TDCs may be employed to compensate for ambient light conditions and changes in ambient light conditions.

In operation of an embodiment, a pixel occupancy histogram may be generated as an output of the TOF image processing system 100 to be exploited by an actuating system, such as the system 200. For example in an automotive control system, based on the histogram and possibly other data, a determination may be made by the control circuitry 110, the other system 200, or a combination thereof, that a collision is likely (e.g., based on a detected decrease in a distance to an object, detection of a certain type of object within a certain distance range, etc.). In response to the determination that a collision is likely, the control circuitry may, for example, take one or more actions to signal that a collision is likely (e.g., generate control signals to sound or signal an alarm), take one or more actions to avoid the collision (e.g., generate control signals to initiate braking or changing course, etc.), etc. In another example, based on the histogram, a determination may be made by the control circuitry 110, the other system 200, or a combination thereof, that a trajectory of a road on which a vehicle is traveling is changing (e.g., based on detect objects in the path or beside the path of the vehicle, etc.). In another example, the control circuitry 110 or the other system 200, or a combination thereof, may use information from the histogram, possible together with additional information, to generate control signals to control execution of a maneuver by a vehicle (e.g., parallel parking, changing lanes, turning the vehicle, etc.).

While the system 100 has been described with respect to individual functional components, the various components may be combined into fewer components or separated into additional components in some embodiments. Some embodiments may have not include each of the illustrated components (e.g., the reflector and the reference array), and some embodiments may have additional components. Some embodiments may include other functions, which may be integrated into the components as illustrated in system 100, or incorporated into the system 100 as additional components. For example, the system 100 may generate other image data in addition to distance data (e.g., color image data), may generate other motion information (e.g., orientation data) using additional sensors (e.g., gyroscopes), the system 100 may include beam deflector control circuitry, optical components and circuitry (e.g., waveguides), pulse shapers, etc. Some embodiments may employ multiple image processing systems, such as multiple LIDAR circuits.

The control circuitry 110 can include the edge detection circuitry 124 and range calculation circuitry 126. The range calculation circuitry may include histogram counter banks that may use memory to count occurrences of edge detection in respective bins corresponding to different clock phases to provide for histogram generation. Other calculation approaches include sigma delta loops and averaging, to name a few.

The system 100 allows for the outputs of the TDCs 122 to be synchronized within one clock domain. This may be achieved with parallel TDCs 122 and clock circuitry 128. The clock circuitry 128 may be phase locked loop clock circuitry that generates a plurality of timing or clock signals that have different phases. These clock signals may be provided to respective ones of the plurality of parallel TDCs 122.

The TDCs 122 convert an event arrival time into a time-stamped digital output. These TDCs provide edge detection These TDCs provide digital time-stamped photons that are then accumulated to generate a histogram. Examples of TDC circuitry are described in U.S. application Ser. No. 15/342,028. Other TDC circuitry may be employed.

A time-domain histogram of a scene spanning a large distance range (e.g., from 1 meter to 300 meters) may create a massive dynamic range of returned photon flux having a difference of many orders of magnitude. Time-to-Digital Converters (TDCs) with direct histogram outputs may have very high data rates and may capture a time-domain histogram of a single spatial point or pixel. To store multiple time slices or depth points the histogram must have many counter bins, which may present a considerable cost in terms of silicon area. Convention approaches use an equal counter bin bit depth for the full range of distance.

Figure 2:
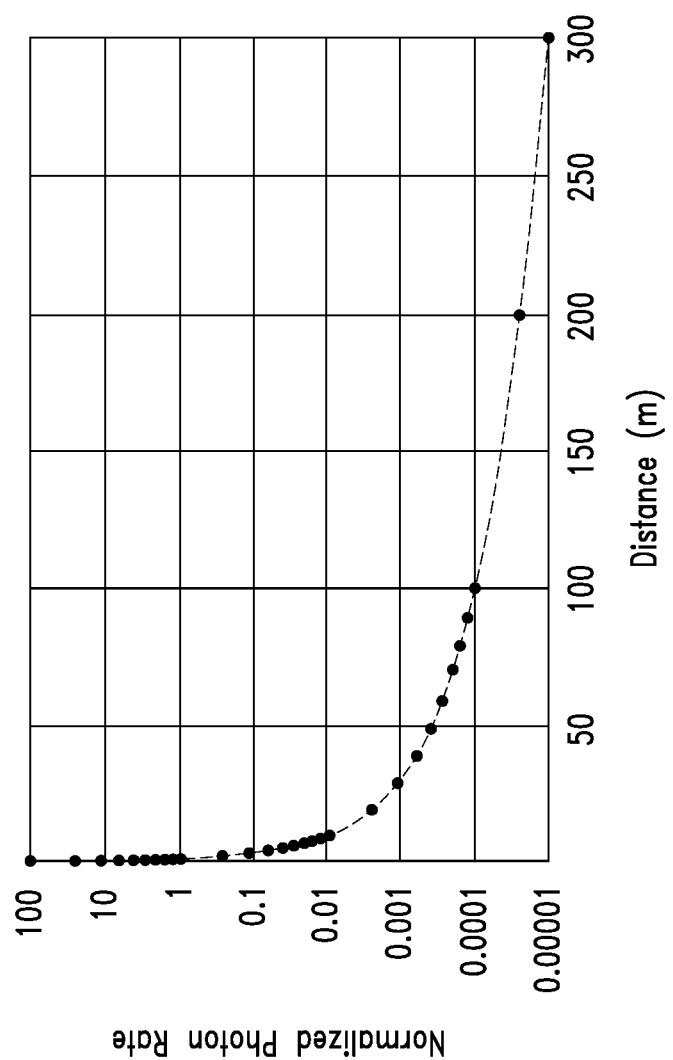
FIG. 2 illustrates an example normalized photon rate assuming a single spot and an inverse square dispersion from the target back to the detector.

The light source 102 may be viewed as a point light source, which means the reflectance may be viewed as following an inverse square law with the intensity per unit area varying in inverse proportion to the square of the distance. FIG. 2 illustrates an example normalized photon rate assuming a single spot and an inverse square dispersion from the target back to the detector. The inventors have recognized that in view of the fact that the reflectance may be consider as following an inverse square law, the bit depth used to store the histogram counts may be scaled across the distance range, for example, using logarithmic scaling.

Figure 3:
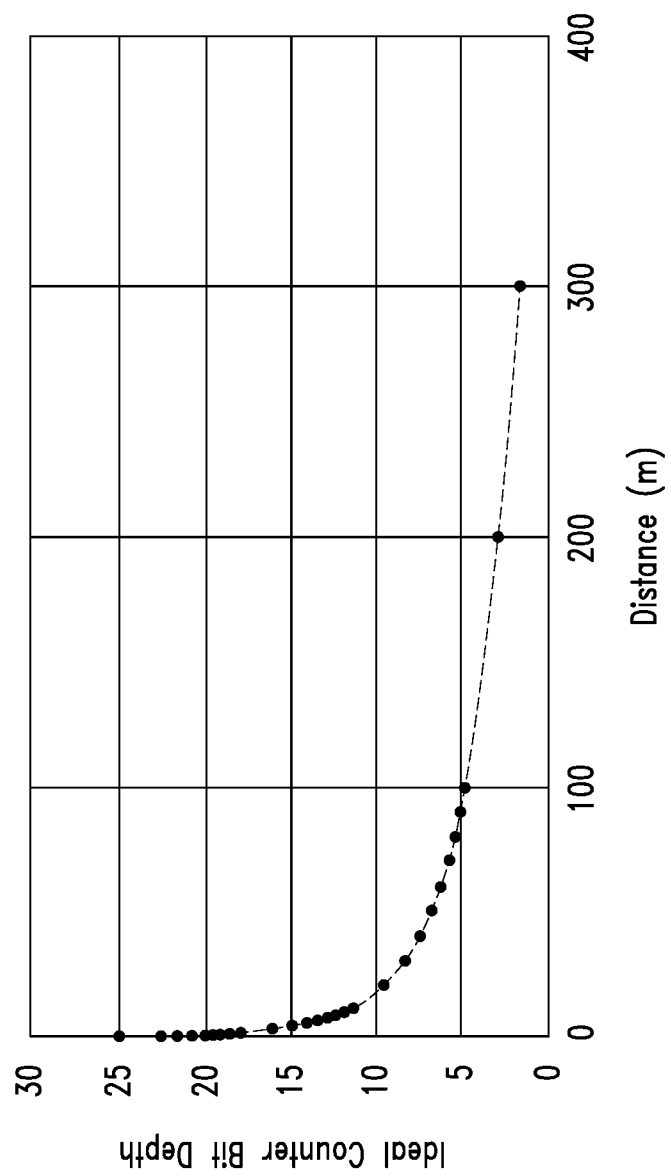
FIG. 3 illustrates an ideal counter bit depth using logarithmic scaling as compared to an equal counter bit depth.

FIG. 3 illustrates an ideal counter bit depth using logarithmic scaling as compared to an equal counter bit depth. In an embodiment, the counter bin bit depth is based on an ideal counter bit depth plus margin bits, with the ideal counter bit depth being based on a logarithmic function of a distance associated with a range of distances associated with the counter bin. Other distance-based scaling functions may be employed, e.g., linear scaling functions, etc., and margin bits may be employed with various scaling functions.

Figure 4:
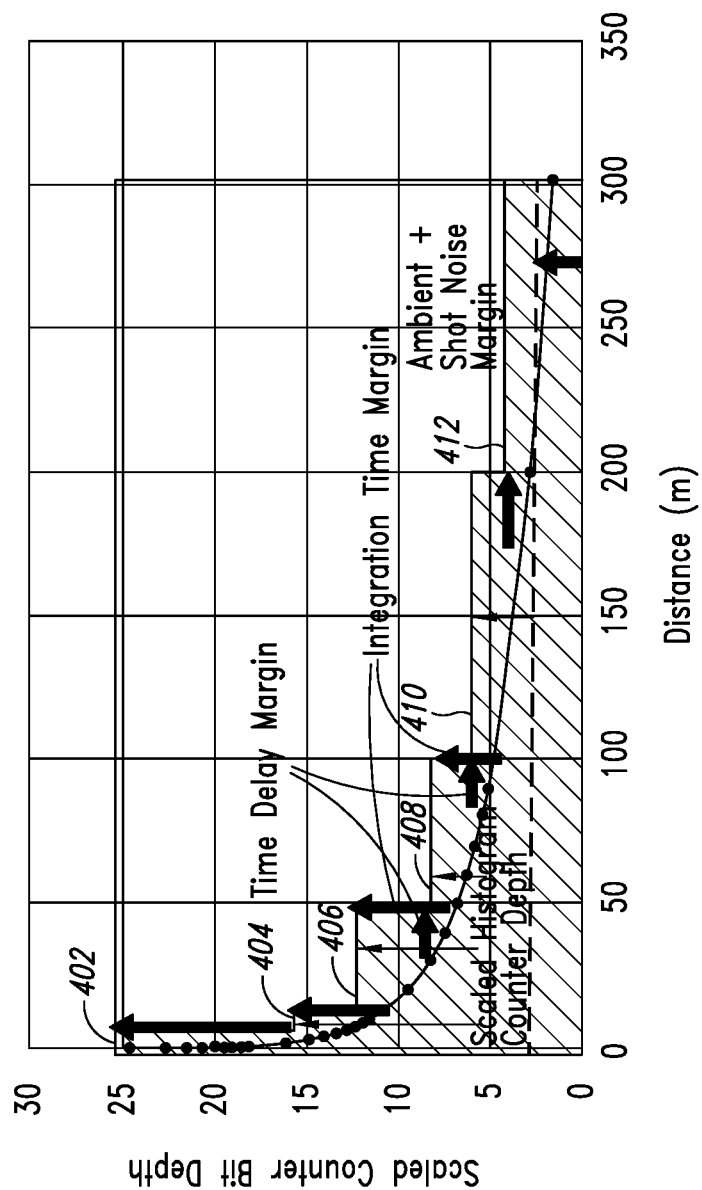
FIG. 4 illustrates an example of histogram counter area savings when using logarithmic scaling of an embodiment.

FIG. 4 illustrates an example of histogram counter area savings of an embodiment. Each bin is assumed to store bit counts for a ten centimeter distance range (e.g., for a total range of distances between zero and three-hundred meters, there are 3000 bins). A first set of bins 402 store histogram counts associated with a first range of distances (as illustrated, between zero and five meters). The bins of the first set of bins 402 have a counter depth of 25 bits. The counter bit depth of 25 bits is based on an ideal counter bit depth which is a logarithmic function of a distance associated with the range of distances between zero and 5 five meters (e.g., 18 bits) plus margin bits (e.g., 7 bits). A second set of bins 404 store histogram counts associated with a second range of distances (as illustrated, between five and ten meters). The bins of the second set of bins 404 have a counter depth of 16 bits. The counter bit depth of 16 bits is based on an ideal counter bit depth which is a logarithmic function of a distance associated with the range of distances between five and ten meters plus margin bits. A third set of bins 406 store histogram counts associated with a third range of distances (as illustrated, between ten and fifty meters). The bins of the third set of bins 406 have a counter depth of 12 bits. The counter bit depth of 12 bits is based on an ideal counter bit depth which is a logarithmic function of a distance associated with the range of distances between ten and fifty meters plus margin bits. A fourth set of bins 408 store histogram counts associated with a fourth range of distances (as illustrated, between fifty and one-hundred meters). The bins of the fourth set of bins 408 have a counter depth of 8 bits. The counter bit depth of 8 bits is based on an ideal counter bit depth which is a logarithmic function of a distance associated with the range of distances between fifty and one-hundred meters plus margin bits. A fifth set of bins 410 store histogram counts associated with a fifth range of distances (as illustrated, between one-hundred and two-hundred meters). The bins of the fifth set of bins 410 have a counter depth of 6 bits. The counter bit depth of 6 bits is based on an ideal counter bit depth which is a logarithmic function of a distance associated with the range of distances between one-hundred and two-hundred meters plus margin bits. A sixth set of bins 412 store histogram counts associated with a sixth range of distances (as illustrated, between two-hundred and three-hundred meters). The bins of the sixth set of bins 412 have a counter depth of 4 bits. The counter bit depth of 4 bits is based on an ideal counter bit depth which is a logarithmic function of a distance associated with the range of distances between two-hundred and three-hundred meters plus margin bits. FIG. 4 assumes an estimated ambient and shot noise bit margin of 3 bits. The ambient margin accounts for a vertical shift in every histogram bin. The shot margin is within one bin. FIG. 4 also shows the time delay and integration time bit margins of the various bins. The area savings in this example is more than 65%.

Other distance ranges for individual bins and for distance ranges associated with the sets of bins may be employed in various combinations. For example, each bin may include counts for a two-meter range, and the bin ranges may be 0-7, 7-25, 25-100, and 100-250. In another example, different sizes for the individual bins may be employed within different sets of bins.

In an embodiment, the first bin may be aligned using time-delay calibration and compensation. In an analog embodiment, the reference input from the reference SPAD array may be used to align the first bin using a delay-locked-loop (DLL) based trim of the laser trigger. The columns may be aligned using a DLL based trim with a per-column delay cell. In a digital embodiment, a timing generator may be used to provide global alignment, and the columns may be aligned using a histogram start shift.

In an embodiment, an SRAM may be employed to store the histogram data using logarithmic scaling of the allocated memory. A first set of bins associated with a first distance range may use two addresses to store counts, a second set of bins associated with a second address range may use one address to store counts, a third set bins associated with a third address range may use a half-address to store counts and a fourth set of bins associated with a fourth address range may use a quarter address to store counts. Some embodiments may employ a hybrid SRAM/counter architecture.

In an embodiment, input-pipes (e.g., from the SPAD arrays 104), readout-pipes (e.g., to image processing circuitry 110 or other systems 200) or both are not scaled, but may instead use a full bit-width. This may facilitate incorporating bin scaling embodiments into existing image processing systems. In an embodiment, clipping for the first bins does not occur so integration for far targets in the later bins will not be impacted as a result of clipping in the first bins. This may facilitate integration timing and sensitivity, with little or no sensitivity limit for the last bins.

Figure 5:
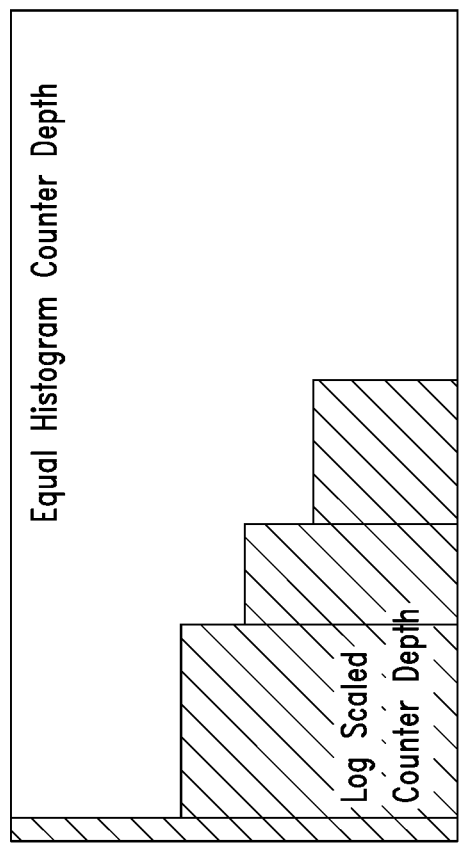
FIG. 5 illustrates an example of histogram counter area savings using ideal logarithmic scaling of an embodiment.

FIG. 5 illustrates an example of histogram counter area savings of an ideal log scaled counter bin bit depth embodiment (assuming no bit margins) as compared to an equal histogram counter bit depth. When an equal bit depth of 18 bits is employed for 3,000 bins, the total number of bits needed to store the histogram is 54,000 bits. When ideal logarithmic scaling of the bin size is employed, 1148 bits may be employed to store the histogram. The area savings is 78% in this example.

Figure 6:
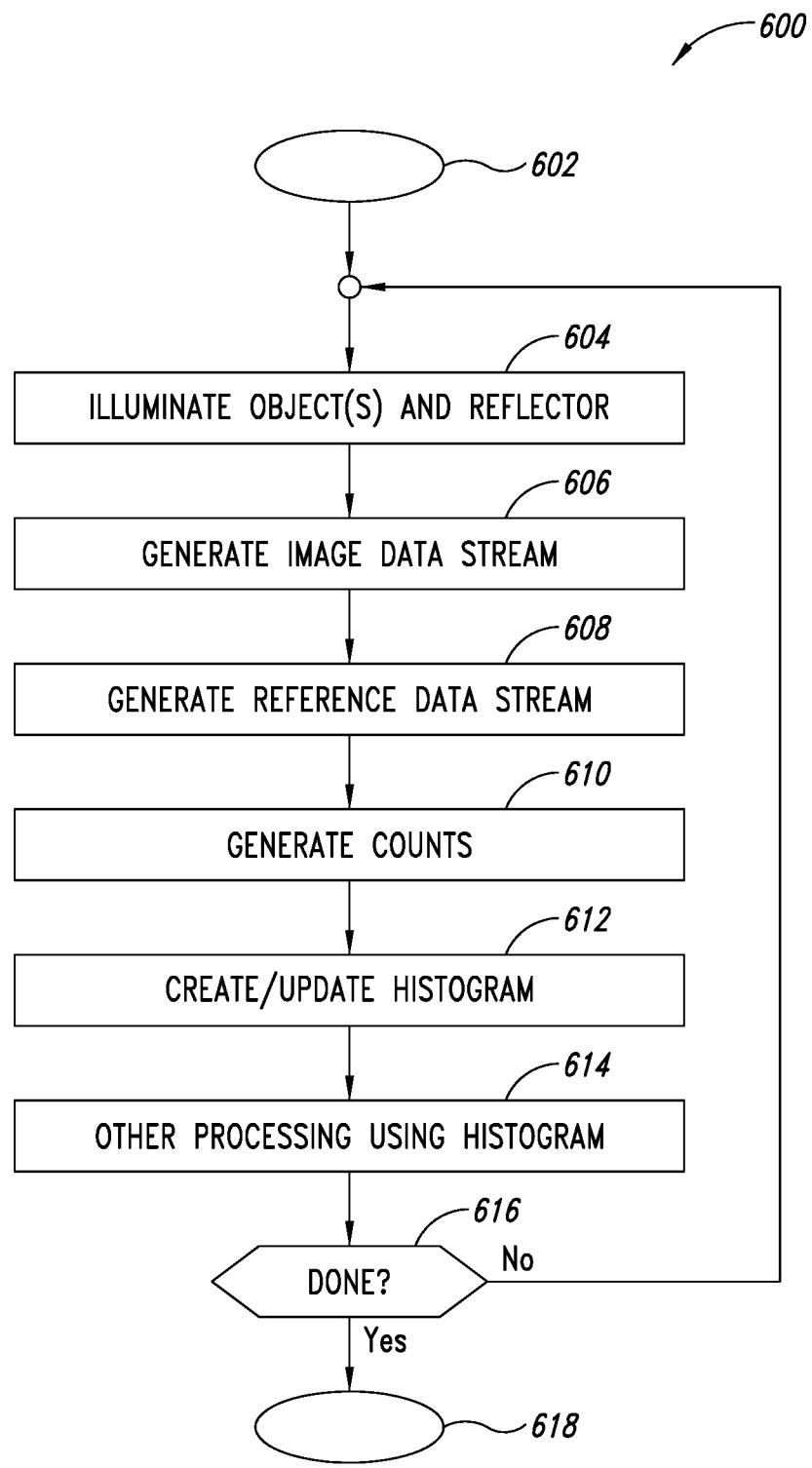
FIG. 6 illustrates an embodiment of a method of operating a time-of-flight imaging system.

FIG. 6 illustrates an embodiment of a method 600 of operating a TOF imaging system. The method 600 is discussed with reference to the system 100 of FIG. 1 to facilitate the description. Other TOF imaging systems may be employed. The method 600 starts at 602, for example in response to a signal received from an external system such as the system 200 of FIG. 1. The method proceeds from 602 to 604.

At 604, one or more objects in an embodiment around an imaging system, such as the system 100, and a reflector of the imaging system, such as the reflector 142, are illuminated. This may be done, for example, using control signal generated by control circuitry, such as the control circuitry 110, to control a light source such as the light source 102, to scan an area in a field of view of the system 100 for objects and to scan the reflector. The method proceeds from 604 to 606.

At 606, the method 600 generates an image data stream based on reflections from the one or more objects in a field of view of the TOF imaging system 100. This may be done, for example, using the return SPAD array 106 of FIG. 1. The method proceeds to 608.

At 608, the method 600 generates a reference data stream based on reflections from a reflector of the TOF imaging system 100. This may be done, for example, using the reference SPAD array 108 of FIG. 1. The method proceeds to 610.

At 610, the method 600 generates counts associated with distances of objects based on the image data stream and the reference data stream. This may be done, for example, using the control circuitry 110 of the system 100, which may include using the time-to-digital converters 122, the clocks 128, the edge detection circuitry 124, and the range detection circuitry 126. The method proceeds from 610 to 612.

At 612, the method 600 creates or updates a histogram by storing count information in a plurality of bins. This may be done, for example, under control of the control circuitry 110 by storing count information in the memory 112. Each of the plurality of bins stores counts associated with a respective distance range, and a size of a bin in the plurality of bins is a function of the respective distance range. In an embodiment, the size of a bin is based on a logarithmic function of a distance or distance range associated with the bin or with a set of bins which includes the bin, as discussed in more detail elsewhere herein. For example, the size of the bin may be equal to an ideal size based on the logarithmic function plus a number of margin bits. The method proceeds from 612 to 614.

At 614, the histogram is used in other processing, for example by the TOF image processing system 100 or by other systems communicatively coupled to the system 100, such as the system 200 of FIG. 1. The other processing may include, for example, generating a pixel occupancy map, generating an alert signal, initiating evasive action, initiation or controlling execution of a driving maneuver, etc. The method 600 proceeds from 614 to 616.

At 616, the method determines whether to continue to gather and process image data. When it is determined at 616 to continue to obtain and process image data, the method returns to 604. When it is not determined at 616 to continue to obtain and process image data, the method proceeds to 618, where other system processing may occur.

Embodiments of the method 600 may include more or fewer acts than illustrated, may perform acts in parallel or in various orders, may combine acts separately illustrated, may separate acts into separate acts, etc., and various combinations thereof. For example, act 606 and 608 may be reversed or performed in parallel, or one of the acts, such as act 608 may be omitted in various embodiments. In another example, act 610 may be split into sub-acts, such as detecting edges, etc.

Some embodiments may take the form of or include computer program products. For example, according to one embodiment there is provided a computer readable medium including a computer program adapted to perform one or more of the methods or functions described above. The medium may be a physical storage medium such as for example a Read Only Memory (ROM) chip, or a disk such as a Digital Versatile Disk (DVD-ROM), Compact Disk (CD-ROM), a hard disk, a memory, a network, or a portable media article to be read by an appropriate drive or via an appropriate connection, including as encoded in one or more barcodes or other related codes stored on one or more such computer-readable mediums and being readable by an appropriate reader device.

Furthermore, in some embodiments, some of the systems and/or modules and/or circuits and/or blocks may be implemented or provided in other manners, such as at least partially in firmware and/or hardware, including, but not limited to, one or more application-specific integrated circuits (ASICs), digital signal processors, discrete circuitry, logic gates, standard integrated circuits, state machines, look-up tables, controllers (e.g., by executing appropriate instructions, and including microcontrollers and/or embedded controllers), field-programmable gate arrays (FPGAs), complex programmable logic devices (CPLDs), etc., as well as devices that employ RFID technology, and various combinations thereof.

The various embodiments described above can be combined to provide further embodiments. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method, comprising:
   illuminating, using an image sensor, one or more objects in an environment around the image sensor;
   generating, using the image sensor, an image data stream based on reflections from the one or more objects;
   generating, using image processing circuitry, counts associated with distances based on the image data stream; and
   storing, using the image processing circuitry, the generated counts in a histogram using a plurality of bins, wherein,
   each of the plurality of bins stores counts associated with a respective distance range; and
   a memory-address size of a bin in the plurality of bins is a function of the respective distance range.

2. The method of claim 1, comprising generating a control signal based on the histogram.

3. The method of claim 2 wherein the control signal controls an automotive system.

4. The method of claim 1, comprising generating a pixel occupancy map based on the histogram.

5. The method of claim 1, wherein the plurality of bins are organized into sets of bins associated with respective distances.

6. The method of claim 1 wherein a memory-address size of a respective bin is based on application of a logarithmic function to a distance associated with a set of bins including the bin.

7. The method of claim 6 wherein the memory-address size of a respective bin is based on a result of the application of the logarithmic function plus a margin.

8. The method of claim 1, comprising using a plurality of digital-to-time converters of the image processing circuitry to generate the counts associated with distances.

9. The method of claim 1, comprising using a plurality of counters in the image processing circuitry as bins to store counts.

10. The method of claim 1, comprising using full and partial addresses in an SRAM of the image processing circuitry as bins to store counts.

11. The method of claim 1, comprising:
    illuminating, using the image sensor, a reference reflector;
    generating, using the image sensor, a reflection data stream based on reflections from the reference reflector; and
    generating, using image processing circuitry, the counts associated with distances based on the image data stream and the reflection data stream.

12. A device, comprising:
    first circuitry, which, in operation, illuminates one or more objects in an environment around the device;
    an image sensor, which, in operation, generates an image data stream based on reflections from the one or more illuminated objects; and
    second circuitry, which, in operation:
       generates counts associated with distances based on the image data stream; and
       stores the generated counts in a histogram using a plurality of bins, wherein,
    each of the plurality of bins stores counts associated with a respective distance range; and
    a memory-address size of a bin in the plurality of bins is a function of the respective distance range.

13. The device of claim 12 wherein the second circuitry, in operation, generates a control signal based on the histogram.

14. The device of claim 13 wherein the control signal is an automotive control signal.

15. The device of claim 12 wherein the second circuitry, in operation, generates a pixel occupancy map based on the histogram.

16. The device of claim 12 wherein the plurality of bins are organized into sets of bins associated with respective distances.

17. The device of claim 12 wherein a memory-address size of a respective bin is based on application of a logarithmic function to a distance associated with a set of bins including the bin.

18. The device of claim 17 wherein the memory-address size of a respective bin is based on a result of the application of the logarithmic function plus a margin.

19. The device of claim 12, comprising:
    a plurality of digital-to-time converters, which, in operation, generate the counts associated with distances.

20. The device of claim 12 wherein the plurality of bins include a plurality of counters.

21. The device of claim 12, comprising:
an SRAM, which in operation, implements at least part of the plurality of bins.

22. The device of claim 12, comprising:
a reference reflector, which, in operation, is illuminated by the illumination circuitry, wherein the image processing circuitry, in operation:
   generates a reflection data stream based on reflections from the reference reflector; and
   generates the counts associated with distances based on the image data stream and the reflection data stream.

23. The device of claim 12 wherein a memory-address size of a respective bin is based on application of a linear function to a distance associated with a set of bins including the bin.

24. The device of claim 23 wherein the memory-address size of a respective bin is based on a result of the application of the linear function plus a margin.

25. A system, comprising:
a time-of-flight (TOF) circuit, including:
   first circuitry, which, in operation, illuminates one or more objects in an environment around the device;
   an image sensor, which, in operation, generates an image data stream based on reflections from the one or more illuminated objects; and
   second circuitry, which, in operation:
      generates counts associated with distances based on the image data stream; and
      stores the generated counts in a histogram using a plurality of bins, wherein, each of the plurality of bins stores counts associated with a respective distance range and a memory-address size of a bin in the plurality of bins is a function of the respective distance range; and
an interface coupled to the TOF circuit.

26. The system of claim 25, comprising:
third circuitry, which, in operation, is communicatively coupled to the TOF circuit via the interface, wherein the third circuitry, in operation, generates control signals to control an automobile.

27. The system of claim 25 wherein the second circuitry includes one or more Light Detection and Ranging (LIDAR) sources.

28. A non-transitory computer-readable medium having contents which, in operation, cause a time-of-flight (TOF) imaging system to perform a method, the method comprising:
   illuminating one or more objects in an environment around the TOF image system;
   generating an image data stream based on reflections from the one or more objects;
   generating counts associated with distances based on the image data stream; and
   storing the generated counts in a histogram using a plurality of bins, wherein,
   each of the plurality of bins stores counts associated with a respective distance range; and
   a memory-address size of a bin in the plurality of bins is a function of the respective distance range.

29. The non-transitory computer-readable medium of claim 28 wherein the method comprises:
   illuminating a reference reflector;
   generating a reflection data stream based on reflections from the reference reflector; and
   generating the counts associated with distances based on the image data stream and the reflection data stream.

30. The non-transitory computer-readable medium of claim 28, comprising a memory storing instructions which when executed by a processor of the TOF imaging system configure the TOF imaging system to perform the method.

* * * * *